May 30, 1939.  A. V. OLIVER  2,160,752
FRICTION CLUTCH
Filed May 12, 1938  3 Sheets-Sheet 1

Inventor
Albert Vere Oliver

Inventor
Albert Vere Oliver

Patented May 30, 1939

2,160,752

UNITED STATES PATENT OFFICE 2,160,752

FRICTION CLUTCH

Albert Vere Oliver, Coventry, England

Application May 12, 1938, Serial No. 207,488
In Great Britain February 12, 1937

19 Claims. (Cl. 192—111)

This invention relates to friction clutches of the kind comprising a friction disc which is carried upon one shaft and is arranged to be gripped frictionally between a pair of circular members on the other shaft, under the action of a series of compression springs, the clutch having a casing, which rotates with the circular members and which supports a plurality of radial clutch-disengaging levers, the inner ends of these being moved by an axially slidable thrust member so as to overcome the compression springs and separate the circular members, thus disengaging the clutch. In such clutches it is necessary to employ radial levers giving a relatively large mechanical advantage, and as a consequence, wear of the clutch surfaces, i. e. the frictionally engaging surfaces of the disc and the circular members, may cause the "clutch fully engaged" position of the thrust member to vary considerably, thus throwing the operating means out of adjustment.

It is the object of the invention to provide an improved arrangement of thrust member which is adapted to compensate automatically for wear in the clutch surfaces by bringing the thrust-receiving end of said thrust member into a predetermined position whenever the clutch is fully engaged.

The invention consists in the provision of a self-adjusting friction clutch in which a central thrust member, arranged between the clutch and its operating mechanism, is automatically adjusted during the normal operation of the clutch to compensate for wear between the clutch surfaces.

For this purpose there is associated with the central thrust member means whereby the effective axial length thereof is automatically reduced so as to maintain the thrust receiving face of said member substantially in the same axial position with the clutch engaged whatever wear may have taken place on the clutch surfaces.

According to one arrangement the automatic reduction of the effective axial length of the central thrust member to compensate for wear at the clutch surfaces may be effected by means of a ratchet device actuated by the normal operation of the clutch acting upon an axially adjustable part of said member.

Alternatively, the axial position of the thrust receiving face of said member may be maintained constant irrespective of wear of the clutch surfaces by means of a torsion spring acting upon an axially adjustable part of said central thrust member.

In order that the invention may be clearly understood it will hereinafter be described as applied, by way of example only, to a clutch of the orthodox single plate type in which a spring loaded presser plate is operatively connected with a central thrust member by means of radially arranged levers pivoted in the rotatable clutch casing.

In the accompanying drawings.

Figure 1:
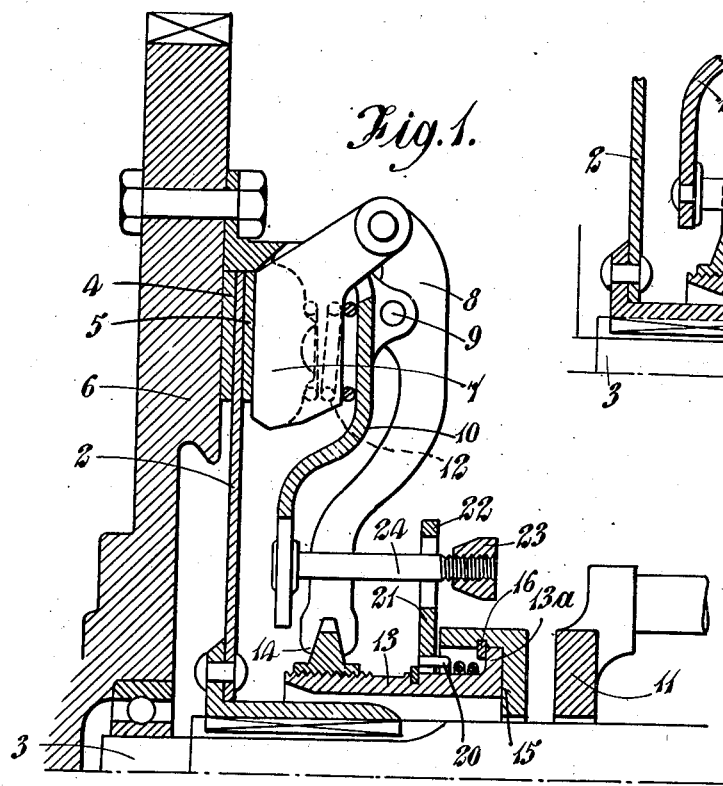
Figure 1 is a longitudinal sectional view of a self-adjusting clutch embodying the present invention.

Referring to the drawings the clutch plate 2 is keyed to the clutch shaft 3 and is adapted to be frictionally clamped between clutch members, 4, 5 carried by the fly-wheel 6 and a presser plate 7 respectively, by means of radial levers 8 pivoted at 9 in the rotatable clutch casing 10 and operatively connected with the presser plate 7 and with a central thrust member which itself is axially movable along the clutch shaft in one direction by a pedal operated thrust pad 11 to release the clutch, and in the reverse direction by the clutch springs 12 to engage the clutch.

In the constructions shown in Figure 1, the central thrust member, which is rotatable as a whole with the clutch casing 10, is made in three parts, viz: a sleeve 13 arranged with clearance around the clutch shaft 3; a thrust plate or lever-actuating member 14 screwing onto the inner end of said sleeve and engaging the inner ends of the levers 8; and a thrust receiving member 15 attached to the flanged outer end 13a of the sleeve by means of a locking ring 16 and adapted to take the disengaging thrust of the pad 11 of the clutch operating mechanism. The said pad has a definite disengagement travel which is also sufficient to leave a clearance between it and the thrust receiving member 15. The sleeve is rotatable relatively to the thrust plate 14 and to the said thrust receiving member and is externally screw-threaded at its inner end to receive the former.

As the clutch members 4, 5 become worn and thinner and the presser plate 7 in consequence approaches closer to the flywheel 6, the radial levers 8 are caused to move the central thrust member axially outwards closer to the thrust pad 11 and will eventually reach a position in which the clutch will be unable to engage fully.

In order to provide against the happening of this contingency means are provided whereby, during the normal operation of the clutch, a small angular movement can be imparted to the sleeve 13 relatively to the thrust plate 14 and thrust receiving member 15, the effect of which is to cause the thrust plate to ride on the threads of the sleeve in a direction towards the thrust receiving member 15 thereby reducing the effective axial length of the central thrust member as a whole. For this purpose there is freely mounted upon the said sleeve the operative member of a ratchet which, when given an oscillating angular movement will rotate the said sleeve relatively to the thrust plate and the thrust receiving member and thereby reduce the axial distance between them. The said ratchet in the arrangement shown in Figure 1 consists of a coil spring 20 having an interference fit around the said sleeve 13 and attached at one end to a plate 21 rotatably mounted on the latter. If this plate is turned in a direction to wind up the spring the coils thereof will grip the sleeve and give it an angular movement in the same direction whilst movement of the said plate in the reverse direction will cause the coils to slip.

The said plate may be operated in any suitable manner. According to the arrangement shown in Figure 1 one or more radial lugs 22 on the said plate may be arranged to co-act with inclined surfaces of adjustable devices carried by the clutch casing 10. As shown, these devices consist of cones 23 screwing onto studs 24 projecting from the clutch casing and adjusted so that immediately wear takes place at the clutch surfaces the resulting additional backward travel of the central thrust member as a whole brings the lugs 22 on the plate 21 of the ratchet into engagement with the inclined faces of the cones 23 thereby causing the coils to grip the sleeve and to impart an angular movement thereto relatively to the thrust plate in a direction to cause the latter to move axially backwards and to thereby reduce the effective axial length of the central thrust member by bringing the thrust plate nearer to the thrust receiving member.

Figure 2:
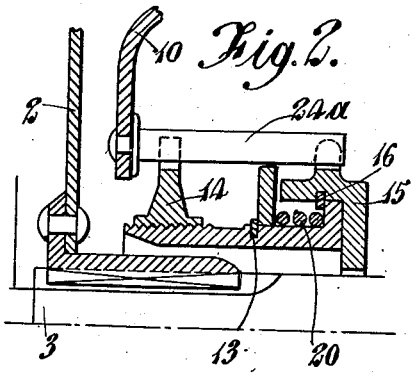
Figure 2 is a part sectional view of the central thrust member taken at another point around the circumference thereof.

As shown in Figure 2, the thrust plate 14 and the thrust receiving member 15 are prevented from rotation relative to the plate 10 by means of pins 24a fixed to the clutch casing 10 and engaging slotted lugs on the said thrust plate and thrust receiving member.

Figure 3:
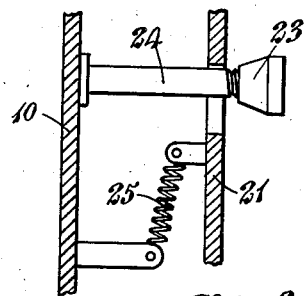
Figures 3 and 4 are detail views illustrating the use of alternative means for operating the ratchet.

The return movement of the plate 21 during the disengagement of the clutch may, as shown in Figure 3, be effected by means of one or more tension springs 25 attached at one end to the said plate and at the other end to the clutch casing 10 and arranged to exert a pull on the plate in a direction to unwind the coils of the spring 20 so that they will slip on the sleeve.

Figure 4:
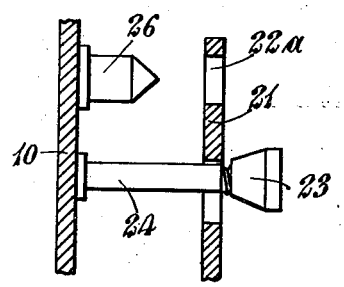

Alternatively, as shown in Figure 4, the ratchet releasing movement of the plate 21 may be produced by means of cones 26 fixed to the clutch casing 10 in a reverse position to those on the studs 24 and adapted on the disengagement of the clutch to contact with holes 22a in the plate 21.

Figure 5:
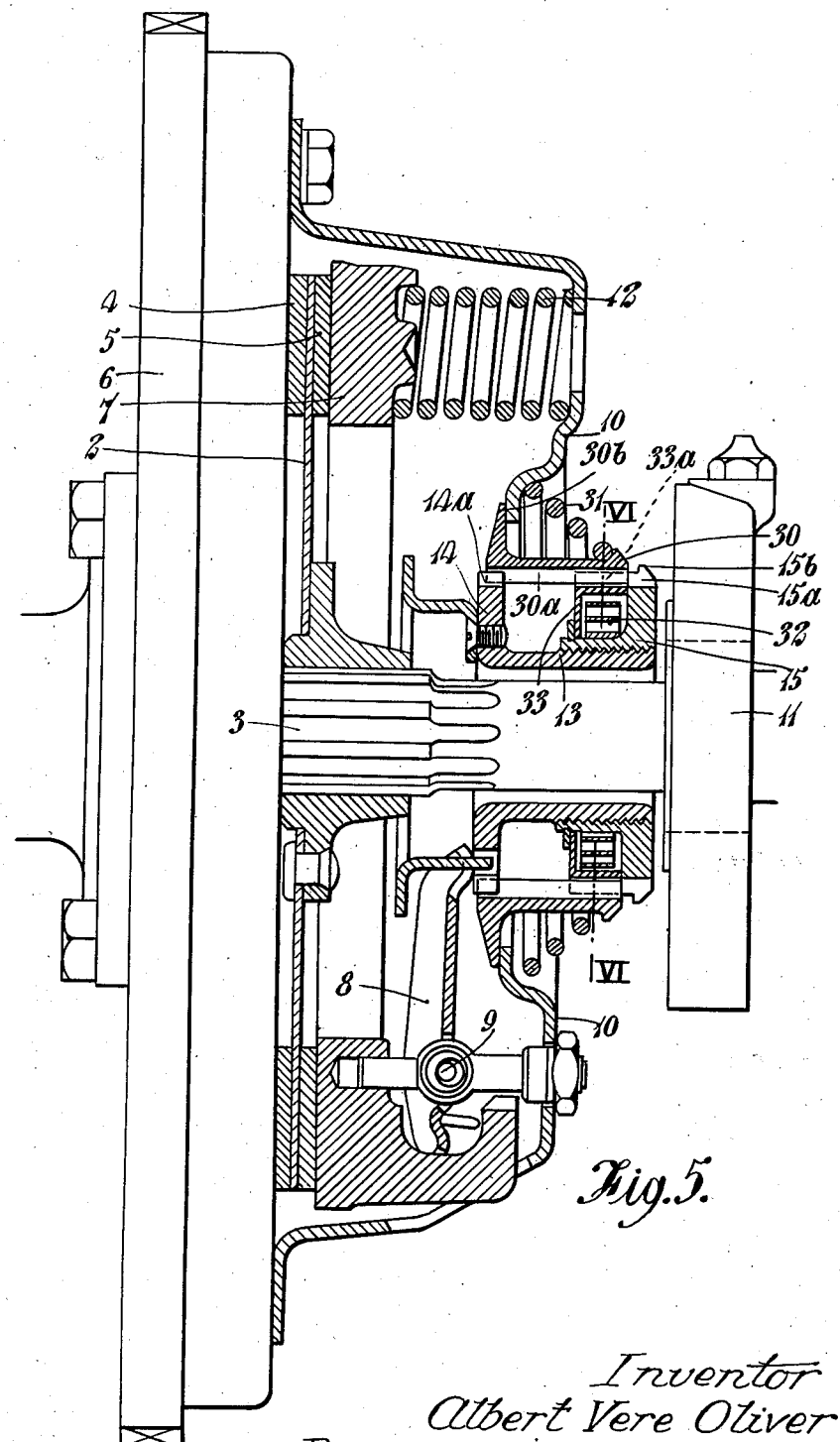
Figure 5 is a sectional view of a modified form of central thrust member constructed and adapted to function in accordance with the present invention.

In a preferred arrangement the effective axial length of the central thrust member is automatically adjusted to compensate for wear at the clutch surfaces by means of a torsion spring arranged to maintain the axial position of the thrust receiving member constant at all times. As shown in Figure 5, the thrust receiving member 15 in this case is rotatably mounted upon the screw-threaded rear end of the sleeve 13, the front end of which is flanged to form the thrust plate 14. Rotation of the sleeve is prevented by the engagement of the thrust plate with the radial levers 8. The thrust plate and the thrust receiving member are each formed with external teeth 14a, and 15a for engagement with internal teeth or splines 30a in an outer sleeve or housing 30 which is concentrically arranged with respect to the sleeve 13 and has a flange 30b at its inner or front end which engages behind the clutch casing 10 and is normally held in contact therewith by means of a compression spring 31.

Between the sleeve 13 and the housing 30 an annular space is left in which a clock spring 32 is arranged. One end of this spring is attached to the thrust receiving member 15 and the other end to an intermediate cup-shaped member 33 which is loosely mounted on the latter and is formed with external teeth 33a which also engage the internal teeth or splines 30a in the housing 30. The outer end of the toothed portion of the thrust receiving member is formed with a shoulder 15b to limit the relative axial movement between the sleeve 13 and the said housing 30.

The self-adjusting action of the clutch in the preferred arrangement above described is as follows: As wear takes place between the clutch surfaces the action of the radial levers 8 is to cause a proportionate outward or rearward axial displacement of the sleeve 13 within the housing 30 toward the thrust pad 11. When, as the result of this displacement, the thrust receiving member 15 on the screw-threaded outer end of the said sleeve, moves rearwardly into a position in which the external teeth 15a at its outer end are free of engagement with the internal teeth 30a of the housing, the clock spring 32 immediately comes into action and, by rotating the thrust receiving member 15 on the screw-threaded end of the sleeve 13, retracts the former into re-engagement with the housing thereby maintaining the axial position of the thrust receiving member constant with respect to the pedal operated thrust pad 11.

The sense of the screw thread is preferably such that any frictional drag between the thrust pad 11 and the thrust receiving member tends to assist the torque exerted on the latter by the clock spring.

The strength of the clock spring is such that when the thrust receiving member has been retracted thereby, and the teeth on the latter are out of register with the teeth or splines in the housing 30, the housing will be forced slightly inwards, against the spring 31, the thrust receiving member continuing to turn under the influence of the clock spring until the teeth thereon enter into engagement with the internal teeth of the housing.

When the thrust pad 11 is moved forward by the pedal to release the clutch, the central thrust member and housing move axially inwards as a single unit against the pressure of the spring 31 acting on the latter, a slight initial relative axial movement taking place between the thrust receiving member 15 and the housing 30 until the shoulder 15b aforesaid on the former makes contact with the outer end of the said housing 30.

Figure 7:
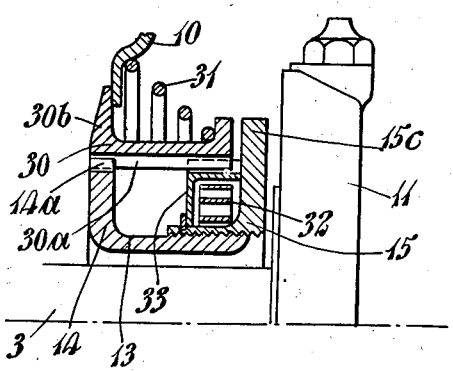

If desired the teeth 15a on the thrust receiving member may be dispensed with and the said member formed with an extended flange 15c, as shown in Figure 7, to take a bearing against the end of the housing 30. In this case, however, the strength of the spring 31 acting on the latter will require to be increased beyond that of the clock spring so as to resist the action of the latter when the thrust receiving member has been retracted with its flange 15c in frictional contact with the end of the housing 30.

Figure 8:
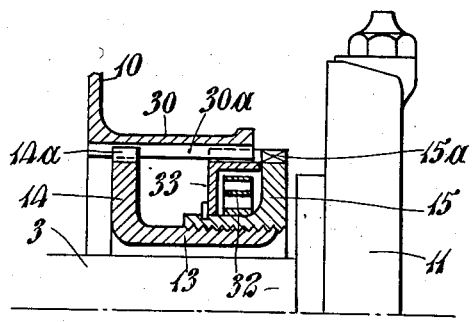

In a further alternative construction, shown in Figure 8, the internally toothed housing 30 may be fixed to or formed in one piece with the clutch casing 10 in which case the shoulder 15b on the externally toothed flange of the thrust receiving member will be dispensed with, as also the need for the spring 31. In order to facilitate engagement of the teeth 15a with the teeth 30a the adjacent ends of these teeth are preferably bevelled or ratchet shaped.

Figure 6:
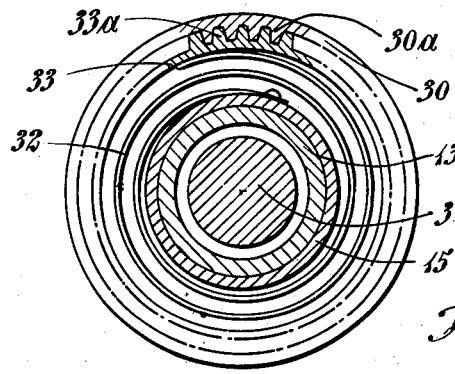
Figure 6 is a transverse sectional view thereof on the line VI—VI of Figure 5, and Figures 7 and 8 are part views of alternative constructions.

In Figures 6 and 7 the relative positions of the constituent elements of the central thrust member are those they would occupy as the result of wear at the clutch surfaces if no means were provided to compensate for such wear. Actually the thrust receiving member 15 never at any time occupies the position shown because of the constant tendency of the clock spring to maintain it in engagement with the housing 30.

If in any of the ratchet arrangements above described it is found that the degree of adjustment of the axial length of the central thrust member during normal driving conditions is insufficient to compensate for wear of the clutch surfaces, the difference may be made up by depressing and releasing the clutch operating pedal until full compensation is effected.

Such parts of the self-adjusting mechanism as are off-set from the rotational axis of the clutch can either be counter-balanced in any suitable manner or distributed at intervals around the said axis so that they balance one another.

What I claim is:

1. In a friction clutch of the kind specified having clutch release levers, the provision of an automatic adjusting device to compensate for wear of the clutch engaging surfaces, said device comprising an annular thrust receiving member, an annular release lever actuating member connected therewith by an adjustable screw threaded thrust-transmitting connection, said thrust receiving member, said lever actuating member and the elements of said adjustable connection encircling the axis of rotation of said clutch adjacent to the inner ends of said release levers, and a member associated with the casing of the clutch and operatively connected with the thrust-transmitting connection automatically to regulate the adjustment of the latter, whereby the thrust-receiving member always returns to the same position when the clutch is fully engaged, despite wear of the clutch surfaces.

2. In a friction clutch of the kind specified, the provision of an automatic adjusting device to compensate for wear of the clutch surfaces, said device comprising an adjustable thrust assembly including cooperating screw threaded elements interposed between the clutch and its operating mechanism, a one way clutch connected with one of said thrust elements, and a member fixed in relation to the casing of the friction clutch to bring about operation of said adjustable thrust assembly by movement imparted through said one way clutch for shortening of the thrust assembly as wear takes place in the clutch surfaces.

3. In a friction clutch of the kind specified, the provision of an automatic adjusting device to compensate for wear of the clutch surfaces, said device comprising a thrust-receiving member, a lever-actuating member connected therewith by means of a screw-thread so as to constitute a thrust member which is adjustable in length by relative rotation of its parts, and a member which is fixed in relation to the casing of the clutch and is operatively connected with the thrust member so as to effect the adjustment of the latter for causing the thrust-receiving part thereof always to return to the same position when the clutch is fully engaged, despite wear of the clutch surfaces.

4. In a friction clutch of the kind specified, the provision of an automatic adjusting device to compensate for wear of the clutch surfaces, said device comprising a thrust-receiving member, a lever-actuating member connected therewith by means of a screw-thread so as to constitute a thrust member which is adjustable in length by relative rotation of its parts, and a ratchet device which is operated during normal actuation of the clutch so as to bring about the shortening of the thrust member and cause the thrust-receiving part thereof always to return to the same position when the clutch is fully engaged, despite wear of the clutch surfaces, said thrust receiving member, said lever operating member and said ratchet device being disposed concentrically about the axis of rotation of said clutch adjacent to the clutch release levers.

5. In a friction clutch of the kind specified, the provision of an automatic adjusting device to compensate for wear of the clutch surfaces, said device comprising a thrust-receiving member, a lever-actuating member connected therewith by means of a screw thread so as to constitute a thrust member which is adjustable in length by relative rotation of its parts, a torsion spring acting between said parts and tending to produce shortening of the thrust member, a casing for said clutch and an abutment carried by said clutch casing so as to limit the action of the torsion spring.

6. In a friction clutch of the kind specified the provision of an automatic adjusting device to compensate for wear of the clutch surfaces, said device being constituted by a movable clutch operating means, a thrust member comprising a rotatable sleeve having a screw thread at one end, a thrust plate axially adjustable along said thread and in operative connection with said movable clutch member, a thrust receiving member connected with the other end of said sleeve, and means whereby as wear takes place at the clutch surfaces the sleeve is automatically rotated in a direction to cause the thrust plate to move axially towards the thrust receiving member to an extent proportional to such wear.

7. In a friction clutch of the kind specified including a clutch casing, the provision of an automatic adjusting device to compensate for wear of the clutch surfaces, said device being constituted by a movable clutch operating member, a thrust member comprising a central sleeve having a thrust plate in operative connection with said movable clutch member and having a screw thread at one end, a thrust receiving member axially adjustable on the threaded end of said sleeve, and means whereby the thrust receiving member is automatically rotated relatively to the sleeve in a direction to maintain the said thrust receiving member in the same axial position with the clutch engaged whatever wear may have taken place at the clutch surfaces.

8. A friction clutch as claimed in claim 7, including a clutch casing and a housing carried by said casing and in which the central thrust member is in positive sliding engagement with said housing carried by said clutch casing, the arrangement being such that any tendency for the thrust receiving member to become disengaged from the housing as the result of wear at the clutch surfaces is counteracted by the action of a torsion spring attached at one end to the thrust receiving member and at the other end to a member in permanent sliding engagement with the housing.

9. A friction clutch as claimed in claim 4, in which the ratchet device consists of a coil spring surrounding the rotatable part of the central thrust member and attached at one end thereto and at the other end to a plate loosely mounted on said part, the arrangement being such that when the clutch is engaged any additional axial movement of the central thrust member due to wear at the clutch surfaces brings the plate into contact with an adjustable inclined surface carried by the clutch casing, the effect of which is to cause the spring to grip and turn the rotatable part of the central thrust member in a direction to reduce the effective axial length of the latter.

10. A friction clutch as claimed in claim 4, in which the ratchet device consists of a coil spring surrounding the rotatable part of the central thrust member and attached at one end thereto and at the other end to a plate loosely mounted on said part, the arrangement being such that when the clutch is engaged any additional axial movement of the central thrust member due to wear at the clutch surfaces brings the plate into contact with an adjustable inclined surface carried by the clutch casing, the effect of which is to cause the spring to grip and turn the rotatable part of the central thrust member in a direction to reduce the effective axial length of the latter, the coil spring being loosened around the rotatable part of the thrust member by movement of the plate as the clutch is disengaged.

11. A friction clutch as claimed in claim 7, in which the thrust plate, and thrust receiving member are each formed with peripheral teeth for sliding engagement with internal teeth or splines in a housing carried by the clutch casing and enclosing the central thrust member.

12. In a friction clutch of the kind specified including a clutch casing, the provision of an automatic adjusting device to compensate for wear of the clutch surfaces, said device comprising a thrust-receiving member and a lever-actuating member screw-threaded together to form a thrust member which is adjustable in length by relative rotation of its parts, an internally splined housing carried by the casing, teeth formed upon the lever-actuating member and arranged in permanent engagement with the splines of the housing, teeth formed upon the thrust-receiving member, and a torsion spring urging the latter to rotate to shorten the thrust member, the teeth upon the thrust-receiving member being normally in engagement with the splines in the housing so as to prevent such rotation but being arranged to pass out of the housing as the clutch is fully engaged after wear of the clutch surfaces has taken place, thus enabling the torsion spring to bring about shortening of the thrust member until the teeth on the thrust-receiving member re-engage with the splines in the housing.

13. A friction clutch as claimed in claim 12, having an intermediate member in non-rotatable but axially slidable relationship to the housing, and serving as an anchorage for the torsion spring.

14. A friction clutch as claimed in claim 12, in which the housing is axially slidable relative to the clutch casing but is urged to a normal position by a coiled compression spring.

15. A friction clutch as claimed in claim 12, in which the housing is axially slidable relative to the clutch casing but is urged to a normal position by a coiled compression spring, the arrangement being such that the action of the torsion spring to shorten the thrust member is stronger than the compression spring, thereby enabling the thrust member to be shortened until the teeth on the thrust-receiving member re-engage with the splines in the housing.

16. A friction clutch as claimed in claim 12, in which a radial shoulder is formed on the teeth of the thrust-receiving member and serves to limit relative movement between the thrust member and the housing.

17. In a friction clutch of the kind specified including a clutch casing, the provision of an automatic adjusting device to compensate for wear of the clutch surfaces, said device comprising a thrust-receiving member and a lever-actuating member screw-threaded together to form a thrust member which is adjustable in length by relative rotation of its parts, an internally splined housing carried by the casing, teeth formed upon the lever-actuating member and arranged in permanent engagement with the splines in the housing, a radial projection formed upon the thrust-receiving member and a torsion spring urging the latter to rotate so as to shorten the thrust member until the projection engages the end of the housing.

18. A friction clutch as claimed in claim 17, in which the housing is mounted slidably in the clutch casing and a compression spring is provided to urge the housing in an axial direction, the effect of the torsion spring in shortening the thrust member being less than the strength of the compression spring.

19. In a friction clutch of the kind specified, the provision of an automatic adjusting device to compensate for wear of the clutch engaging surfaces, said device including, a thrust transmitting member, a clutch release-lever actuating member connected therewith by means of a screw thread so as to constitute a thrust assembly that is adjustable in length by relative rotation of said thrust transmitting and said lever actuating members, a spring encircled about and operatively associated with one of said members, an element engaging said spring at one end thereof, and means carried by said casing and operatively connected with said element, the parts of said device being so arranged relative to one another that movement of said thrust assembly beyond a predetermined limit during clutch engagement will initiate action of said spring to cause relative rotation of said members for shortening said assembly in proportion to the degree of movement beyond said limit.

ALBERT VERE OLIVER.